United States Patent [19]

Yonezawa et al.

[11] 4,236,928
[45] Dec. 2, 1980

[54] CERAMIC COMPOSITIONS

[75] Inventors: Masatomo Yonezawa; Kazuaki Utsumi; Tomeji Ohno, all of Tokyo, Japan

[73] Assignee: Nippon Electric Co., Ltd., Tokyo, Japan

[21] Appl. No.: 88,534

[22] Filed: Oct. 26, 1979

[30] Foreign Application Priority Data

Oct. 24, 1978 [JP] Japan .................................. 53-130789

[51] Int. Cl.$^3$ .......................... C04B 35/00; H01B 3/02
[52] U.S. Cl. .................................. 106/39.5; 252/63.2; 252/63.5

[58] Field of Search ..................... 106/39.5; 252/63.5, 252/63.2

[56] References Cited

U.S. PATENT DOCUMENTS 4,078,938  3/1978  Yonezawa .......................... 106/39.5

Primary Examiner—Helen M. McCarthy
Attorney, Agent, or Firm—Fitzpatrick, Cella, Harper & Scinto

[57] ABSTRACT

A ceramic composition consisting essentially of $Pb(Fe_{\frac{1}{2}}Nb_{\frac{1}{2}})O_3$, $Pb(Fe_{\frac{2}{3}}W_{\frac{1}{3}})O_3$ and $Pb(Zn_{\frac{1}{3}}Nb_{\frac{2}{3}})O_3$ which allows low-temperature sintering and has a high dielectric constant and a good dielectric constant temperature coefficient.

3 Claims, 1 Drawing Figure

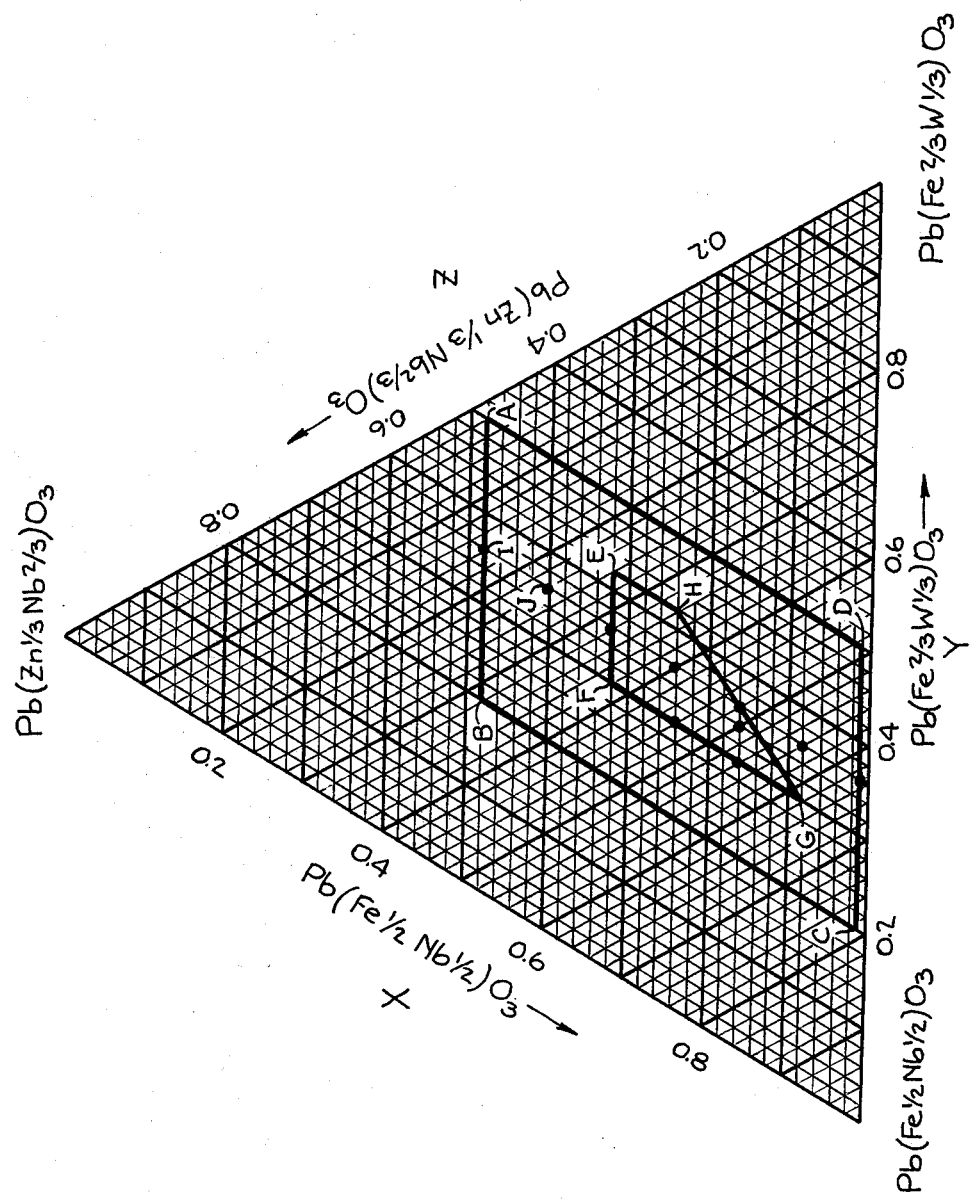

CERAMIC COMPOSITIONS

BACKGROUND OF THE INVENTION

The present invention relates to ceramic compositions allowing low-temperature sintering and having a high dielectric constant.

As is well known in the art, ceramic compositions principally consisting of barium titanate (Ba Ti O3) have been widely used in practice as a dielectric material of high dielectric constant. However, the ceramic compositions principally consisting of Ba Ti O3 must be sintered at a high temperature in the range from 1300° C. to 1400° C., and hence, they have a shortcoming that in cases where they are used in electronic parts such as, for example, multilayer ceramic capacitors, costly noble metals such as platinum, palladium or the like which can stand such high sintering temperature must be used as internal electrodes of the capacitors.

Accordingly, there has been a strong demand for ceramic dielectric materials which can be sintered at a temperature as low as possible, especially at a temperature below 1000° C. and preferably below 960° C. for enabling the use of inexpensive metals such as nickel, silver or the like as the internal electrodes and yet which have a high dielectric constant.

U.S. Patent 4,078,938 has proposed binary system ceramic compositions consisting of $Pb(Fe_{\frac{1}{2}}Nb_{\frac{1}{2}})O_3$ and $Pb(Fe_{\frac{2}{3}}W_{\frac{1}{3}})O_3$ and ternary system ceramic compositions consisting of $Pb(Fe_{\frac{2}{3}}W_{\frac{1}{3}})O_3$, $Pb(Fe_{\frac{1}{2}}Nb_{\frac{1}{2}})O_3$ and $Pb(Mn_{\frac{1}{3}}Me_{\frac{2}{3}})O_3$ (where Me represents any one of Nb, Ta and Sb), both of which can be sintered at a low temperature. However, the former binary system compositions have a shortcoming that their dielectric loss is relatively large, though their dielectric constant is as high as 8000 or higher at a room temperature.

The latter ternary system compositions have a very high dielectric constant, a low dielectric loss and a high specific resistance where the $Pb(Mn_{\frac{1}{3}}Me_{\frac{2}{3}})O_3$ content is small. However, the temperature coefficient of the dielectric constant thereof is so large that they are principally only adapted to ceramic capacitors of the Y5V rating of the EIA (U.S. Electronics Industries Association) Standard which means that a temperature coefficient of an electrostatic capacitor lies within a range of +22 to −82% at an operating temperature of −30° to +85° C. For the ceramics of the aforementioned ternary system compositions to meet the EIA Standard's Z5U rating (a temperature coefficient of a capacity of +20 to −56% at an operating temperature ranging +10° to +85° C.), the amount of the $Pb(Mn_{\frac{1}{3}}Me_{\frac{2}{3}})O_3$ content would have to be increased. However, an increase in that content will result, where Me is Nb or Ta, in that tan δ, the dielectric constant, and the specific resistivity of the compositions are deteriorated, as indicated by the Specimen Nos. 48 and 56 in Table 3 of U.S. Pat. No. 4,078,938; or where Me is Sb, in that the dielectric constant and a the specific resistivity are at a low level, though tan δ is small, as indicated by the Specimen No. 63 in the same table.

According to the EIA Standard, the insulating resistance of laminated capacitors of Z5U rating is regulated to be $7.5 \times 10^9 \Omega$ or higher, or in terms of a product of capacitance (C) by resistance (R) it is regulated to be 75 FΩ or higher. In other words, it is regulated as follows:

$$C \times R = (\epsilon\epsilon_o \times \frac{S}{d}) \times (\rho \times \frac{d}{S}) = \epsilon_o\epsilon\rho$$

$$= 8.855 \times 10^{-14} \times \epsilon \times \rho \geq 75 \, F\Omega$$

where ε is the relative dielectric constant of the dielectric material in the capacitor, $\epsilon_o$ is the dielectric constant of a vacuum, ρ is the specific resistivity (in Ω.cm), d is the thickness of the dielectric material, and S an area of the dielectric material. In view of this relationship, it is necessary to raise the resistance, if the dielectric constant of the dielectric material is lowered. For example, in the case of ε=10,000, a dielectric material must have a specific resistivity of $8.47 \times 10^{10}$ Ωcm or higher, whereas in the case of ε=5000, at least a doubled specific resistivity of $1.69 \times 10^{11}$ Ωcm or higher becomes necessary. So long as a specific resistivity higher than this value is possessed, a capacitor having any capacitance can suffice the requirement for the insulating resistance. However, if a specific resistivity is lower than $1.69 \times 10^{11}$ Ωcm in the case of ε=5000, then only a laminated capacitor having a capacitance of 0.01 μF. or less is produced. Also, it is required to have a tan δ of 2.5% or less in the Z5U rating. In conclusion, with the ternary system compositions disclosed in U.S. Pat. No. 4,078,938, it is impossible to produce a laminated capacitor adapted to the Z5U rating capacitors in the practical capacitance range even by increasing the amount of the $Pb(Mn_{\frac{1}{3}}Me_{\frac{2}{3}})O_3$ content. Much less, laminated capacitors adapted to the Z5T rating (the temperature coefficient of the capacitance being ±10% in the temperature range of 10° to +85° C.), the Z5S rating (the temperature coefficient of the capacitance being ±22% in the same temperature range) or the Z5R rating (the temperature coefficient of the capacitance being ±15% in the same temperature range) all of the EIA Standard cannot be produced.

Also proposed have been binary system ceramic compositions consisting of $Pb(Fe_{\frac{2}{3}}W_{\frac{1}{3}})O_3$ and $Pb(Zn_{\frac{1}{3}}Nb_{\frac{2}{3}})O_3$, as disclosed in patent application No. 53-19600 published before examination. However, with this binary system composition, though the specific resistance is increased as the proportion of $Pb(Zn_{\frac{1}{3}}Nb_{\frac{2}{3}})O_3$ is increased, the dielectric constant reaches the maximum where $Pb(Zn_{\frac{1}{3}}Nb_{\frac{2}{3}})O_3$ is 40 mol % and decreases as it is further increased. Consequently, Z5U rating capacitors cannot be produced by use of these compositions. Moreover, tan δ, the temperature coefficient of the dielectric constant and the specific resistivity of these compositions are liable to vary depending upon a sintering temperature, and therefore, mass-production of capacitors is difficult.

SUMMARY OF THE INVENTION

It is one object of the present invention to provide excellent practical ceramic compositions which allow low-temperature sintering and have a high dielectric constant, a small dielectric loss, a high specific resistivity and a reduced temperature coefficient of the dielectric constant.

Another object of the present invention is to provide ceramic compositions for capacitors which meet the Z5U rating of the EIA Standard.

Still another object of the present invention is to provide ceramic compositions for capacitors which have a small temperature coefficient of a capacitance and meet the Z5T, Z5S and Z5R ratings EIA Standard.

The present invention, provides novel ternary system ceramic compositions consisting essentially of [Pb(Fe$_{\frac{1}{2}}$Nb$_{\frac{1}{2}}$)O$_3$]$_x$ [Pb(Fe$_{\frac{2}{3}}$W$_{\frac{1}{3}}$)O$_3$]$_y$ [Pb(Zn$_{\frac{1}{3}}$Nb$_{\frac{2}{3}}$)O$_3$]$_z$, where x+y+z=1.00, in which the respective propordiscs of about 0.5 mm in thickness, and then silver electrodes were attached by baking. Various properties of ceramic compositions thus obtained are shown in Table 1.

TABLE 1

| No. | Composition Pb(Fe$_{\frac{1}{2}}$Nb$_{\frac{1}{2}}$)O$_3$ x | Pb(Fe$_{\frac{2}{3}}$W$_{\frac{1}{3}}$)O$_3$ y | Pb($_{\frac{1}{3}}$Nb$_{\frac{2}{3}}$)O$_3$ z | Sintering Temperature (°C.) | Dielectric Constant | Dielectric Loss (%) | Temperature Coefficient of Dielectric Constant −30° C. | +10° C. | +85° C. | Specific Resistivity (Ω · cm) |
|---|---|---|---|---|---|---|---|---|---|---|
| 1* | 0.80 | 0.20 | 0.00 | 950 | 8400 | 5.3 | −68 | −23 | +25 | 8 × 10$^7$ |
| 2* | 0.64 | 0.36 | 0.00 | 950 | 19800 | 5.2 | −70 | +6 | −73 | 5 × 10$^7$ |
| 3 | 0.63 | 0.36 | 0.01 | 930 | 18500 | 2.1 | −68 | +5 | −70 | 1 × 10$^{10}$ |
| 4 | 0.56 | 0.36 | 0.08 | 870 | 12700 | 0.69 | −64 | +2 | −68 | 2 × 10$^{11}$ |
| 5 | 0.56 | 0.36 | 0.08 | 880 | 13800 | 0.65 | −64 | +2 | −69 | 3 × 10$^{10}$ |
| 6 | 0.56 | 0.36 | 0.08 | 890 | 14800 | 0.62 | −65 | +2 | −69 | 3 × 10$^{11}$ |
| 7 | 0.62 | 0.30 | 0.08 | 880 | 13400 | 0.89 | −72 | −23 | −53 | 5 × 10$^{11}$ |
| 8 | 0.48 | 0.36 | 0.16 | 870 | 12700 | 0.73 | −57 | −12 | −57 | 9 × 10$^{11}$ |
| 9 | 0.50 | 0.34 | 0.16 | 870 | 12100 | 0.75 | −60 | −15 | −45 | 8 × 10$^{11}$ |
| 10 | 0.54 | 0.30 | 0.16 | 870 | 10800 | 0.84 | −62 | −17 | −33 | 6 × 10$^{11}$ |
| 11 | 0.34 | 0.42 | 0.24 | 870 | 11800 | 0.65 | −50 | −8 | −55 | 8 × 10$^{11}$ |
| 12 | 0.40 | 0.36 | 0.24 | 870 | 10900 | 0.77 | −55 | −11 | −47 | 6 × 10$^{11}$ |
| 13 | 0.46 | 0.30 | 0.24 | 870 | 9400 | 0.96 | −54 | −15 | −28 | 7 × 10$^{11}$ |
| 14 | 0.26 | 0.42 | 0.32 | 870 | 6000 | 0.45 | −35 | +4 | −50 | 7 × 10$^{11}$ |
| 15 | 0.32 | 0.36 | 0.32 | 870 | 6400 | 0.67 | −42 | −8 | −35 | 5 × 10$^{11}$ |
| 16 | 0.38 | 0.30 | 0.32 | 870 | 5900 | 0.85 | −50 | −14 | −20 | 8 × 10$^{11}$ |
| 17 | 0.24 | 0.36 | 0.40 | 870 | 2800 | 0.54 | −26 | −6 | −11 | 3 × 10$^{12}$ |
| 18 | 0.24 | 0.36 | 0.40 | 880 | 3050 | 0.62 | −30 | −7 | −12 | 2 × 10$^{12}$ |
| 19 | 0.24 | 0.36 | 0.40 | 890 | 3400 | 0.72 | −34 | −8 | −12 | 1 × 10$^{12}$ |
| 20 | 0.16 | 0.36 | 0.48 | 890 | 1800 | 0.72 | −25 | −5 | +5 | 4 × 10$^{12}$ |
| 21 | 0.49 | 0.50 | 0.01 | 890 | 9900 | 2.5 | +32 | +27 | −65 | 1 × 10$^{10}$ |
| 22 | 0.32 | 0.20 | 0.48 | 900 | 1710 | 0.65 | −33 | −6 | +15 | 5 × 10$^{12}$ |
| 23 | 0.02 | 0.50 | 0.48 | 880 | 2020 | 0.88 | −14 | +1 | −12 | 4 × 10$^{12}$ |
| 24* | 0 | 0.60 | 0.40 | 870 | 5030 | 1.2 | +12 | +16 | −66 | 2 × 10$^{11}$ |
| 25* | 0 | 0.60 | 0.40 | 880 | 5550 | 0.25 | +7 | +11 | −58 | 6 × 10$^{11}$ |
| 26* | 0 | 0.60 | 0.40 | 890 | 4830 | 1.8 | −3 | +2 | −43 | 8 × 10$^{10}$ |

Note:
Compositions of the Nos. with an asterisk are outside the scope of the present invention.

tions x, y and z are limited within the ranges of $0.02 \leq x \leq 0.79$, $0.20 \leq y \leq 0.50$, and $0.01 \leq z \leq 0.48$, respectively. These novel compositions can be sintered at a temperature as low as 950° C. or less, and have a reduced temperature coefficient of capacitance (dielectric constant), small tan δ and a high specific resistivity with the dielectric constant held at a high level. Thus, the ceramic material of the invention can produce capacitors which well meet the Z5U rating. By increasing the proportion of the Pb(Zn$_{\frac{1}{3}}$Nb$_{\frac{2}{3}}$)O$_3$ content, ceramic compositions which can meet the Z5T, Z5S and Z5R ratings having a smaller temperature coefficient of a capacitance can be obtained, though the dielectric constant is reduced.

BRIEF DESCRIPTION OF THE DRAWING

The single diagram in the accompanying drawing shows the composition range of the ternary system ceramic compositions according to the present invention.

DETAILED DESCRIPTION OF THE PREFERRED EMBODIMENTS

At first, lead oxide (PbO), ferric oxide (Fe$_2$O$_3$), niobium oxide (Nb$_2$O$_5$), zinc oxide (ZnO) and tungsten oxide (WO$_3$) were prepared in powder form as starting materials and weighed so that compositions shown in Table 1 resulted. Then these materials were mixed in a wet manner within a ball mill, and thereafter the mixtures were presintered at a temperature of 700° C. to 800° C. These materials were crushed, then molded under a pressure of about 0.7 ton/cm$^2$ into a solid cylindrical shape of about 16 mm in diameter and of about 10 mm in thickness, followed by sintering at a temperature of 870° C. to 950° C. The sintered bodies were cut into The dielectric constant and the dielectric loss were measured at 20° C. at a frequency of 1 KHz. The specific resistivity was measured at 20° C. as applying a D.C. voltage of 100 V. The temperature coefficient of a dielectric constant was obtained by measuring a dielectric constant ($\epsilon_t$) at a temperature t° C. and calculating with reference to the dielectric constant ($\epsilon_{20}$) at 20° C. according to the following formula:

$$[(\epsilon_t - \epsilon_{20})/\epsilon_{20}] \times 100 \ (\%)$$

As will be apparent from the Table 1, the ternary system ceramic compositions consisting of Pb(Fe$_{\frac{1}{2}}$Nb$_{\frac{1}{2}}$)O$_3$, Pb(Fe$_{\frac{2}{3}}$W$_{\frac{1}{3}}$)O$_3$ and Pb(Zn$_{\frac{1}{3}}$Nb$_{\frac{2}{3}}$)O$_3$ according to the present invention provide an excellent ceramic material having a high dielectric constant, a small dielectric loss, a high specific resistivity, a good temperature coefficient of the dielectric constant and little dependency upon a sintering temperature of various properties and yet having a very high mass-productivity, as distinguished from the binary system ceramic compositions consisting of Pb(Fe$_{\frac{1}{2}}$Nb$_{\frac{1}{2}}$)O$_3$ and Pb(Fe$_{\frac{2}{3}}$W$_{\frac{1}{3}}$)O$_3$ or of Pb(Fe$_{\frac{2}{3}}$W$_{\frac{1}{3}}$)O$_3$ and Pb(Zn$_{\frac{1}{3}}$Nb$_{\frac{2}{3}}$)O$_3$ or from the ternary system ceramic compositions consisting of Pb(Fe$_{\frac{1}{2}}$Nb$_{\frac{1}{2}}$)O$_3$, Pb(Fe$_{\frac{2}{3}}$W$_{\frac{1}{3}}$)O$_3$ and Pb(Mn$_{\frac{1}{3}}$Me$_{\frac{2}{3}}$)O$_3$.

Especially due to the fact that the sintering temperature is as low as 870° C. to 950° C., the subject compositions provide very excellent characteristic effects and advantages so that not only can the manufacturing cost be lowered by the remarkable enhancement of the durability of furnace materials used upon sintering and the reduction of the expense of electric power consumption, but also the reduction of cost of internal electrodes in cases where the composition are being utilized in a large-capacity laminated capacitors or the like can be realized.

The reasons for the limitation of the proportions x, y and z to the ranges of $0.02 \leq x \leq 0.79$, $0.20 \leq y \leq 0.50$ and $0.01 \leq z \leq 0.48$ are as follows: If x is smaller than 0.02, then the dielectric constant is low and dependency upon sintering conditions of properties is large. When x exceeds 0.79 or when y is smaller than 0.2, the Curie point shifts largely to the high-temperature side with respect to the room temperature, and consequently, the temperature coefficient of the dielectric constant at $-30°$ C. becomes large. If y exceeds 0.5, then the Curie point shifts largely to the low-temperature side with respect to the room temperature, so that the temperature coefficient of a dielectric constant at 850° C. becomes large. If z is smaller than 0.01, the dielectric loss becomes large and the specific resistivity becomes small. If z is larger than 0.48, then the dielectric constant becomes low. The above-defined ceramic compositions fall within the region encircled by a parallelogram ABCD in the ternary system composition diagram of the accompanying drawing. Especially, within a region encircled by a trapezoid EFGH in the same composition diagram, that is, the ranges of $0.26 \leq x \leq 0.62$, $0.3 \leq y \leq 0.42$ $0.08 \leq z \leq 0.32$, the compositions have a small temperature coefficient of a dielectric constant meeting the Z5U rating. In addition, it can be seen from Table 1 that the compositions represented by points I and J etc. in the same composition diagram which contain a high proportion of $Pb(Zn_{\frac{1}{3}}Nb_{\frac{2}{3}})O_3$ meet the Z5T, Z5S and Z5R ratings.

Laminated capacitors were produced by making use of the ceramic compositions according to the present invention under the following design conditions, and various properties of the capacitors were measured. Results of the measurement are shown in Table 2 below.

[Design Conditions]

Thickness of a green ceramic sheet: 45 μm

Area of an internal electrode applied to the green ceramic sheet: 3 mm × 5 mm = 15 mm²

Thickness of the applied internal electrode: 6 μm

Material of the internal electrode: Ag (100%)

Sintering temperature of the green ceramic sheet with the applied internal electrodes: 850° C.

Laminated number of sheets with internal electrodes: 11 (11 sheets were connected in parallel when a capacitor is formed)

TABLE 2

| Composition | | | Capacitance | Tanδ | Capacitance Change | | | Insulation |
| --- | --- | --- | --- | --- | --- | --- | --- | --- |
| x | y | z | μF(20° C.) | (%) | −30° C. | +10° C. | +85° C. | Resistance(Ω) |
| 0.50 | 0.34 | 0.16 | 0.22 | 0.60 | −55 | −7 | −51 | $1.9 \times 10^{10}$ |
| 0.40 | 0.36 | 0.24 | 0.17 | 0.95 | −50 | −5 | −52 | $2 \times 10^{10}$ |
| 0.32 | 0.36 | 0.32 | 0.09 | 0.88 | −38 | −3 | −39 | $4 \times 10^{10}$ |

Note:
The capacitance change (temperature coefficient of the dielectric constant) is somewhat different between a single plate capacitor and a laminated capacitor.

The laminated capacitors indicated in Table 2 involve the ceramic compositions whose proportions x, y and z are all located in the region of the trapezoid EFGH in the composition diagram, and with reference to the changes of the capacitance with temperature, all the capacitors fulfil the Z5U rating.

As described above, the ternary system ceramic compositions consisting essentially of $Pb(Fe_{\frac{1}{2}}Nb_{\frac{1}{2}})O_3$, $Pb(Fe_{\frac{2}{3}}W_{\frac{1}{3}})O_3$ and $Pb(Zn_{\frac{1}{3}}Nb_{\frac{2}{3}})O_3$ according to the present invention can provide ceramic compositions which have a low sintering temperature and which can meet the Z5U rating of EIA Standard and further can meet the Z5T, Z5S and Z5R ratings that impose more severe conditions for the temperature coefficient of the capacitance, and the practical value of these novel ceramic compositions is very great.

What is claimed is:

1. A ceramic composition consisting essentially of $[Pb(Fe_{\frac{1}{2}}Nb_{\frac{1}{2}})O_3]_x$ $[Pb(Fe_{\frac{2}{3}}W_{\frac{1}{3}})O_3]_y$ $[(Pb(Zn_{\frac{1}{3}}Nb_{\frac{2}{3}})O_3]_z$ wherein $x+y+z=1.00$ and the proportions x, y and z fall within the respective ranges of:

$0.02 \leq x \leq 0.79$, $0.20 \leq y \leq 0.50$, and $0.01 \leq z \leq 0.48$.

2. A ceramic composition as claimed in claim 1, wherein the proportions x, y and z fall within the ranges of:

$0.26 \leq x \leq 0.62$ $0.30 \leq y \leq 0.42$, and $0.08 \leq z \leq 0.32$.

3. A ceramic composition as claimed in claim 1, wherein the proportions of x, y and z fall within the ranges represented by the trapezoid EFGH in the accompanying drawing.

* * * * *

UNITED STATES PATENT AND TRADEMARK OFFICE
CERTIFICATE OF CORRECTION

PATENT NO. : 4,236,928
DATED : Dec. 2, 1980
INVENTOR(S) : Yonezawa, et al.

It is certified that error appears in the above—identified patent and that said Letters Patent is hereby corrected as shown below:

Column 1

Line 32, substitute --2/3-- for "170"

Line 40, substitute --2/3-- for "170"

Column 2

Line 9, substitute --·-- for "." (dot should be in middle of line)

Line 30, substitute --2/3-- for "170"

Line 40, substitute --2/3--for "170"

Line 41, substitute --Japanese Patent Application-- for "patent application"

Column 3

Table 1, heading for fourth column, substitute --Pb(Zn1/3Nb2/3)O$_3$-- for "Pb(1/3Nb2/3)O$_3$"

Signed and Sealed this

Seventh Day of April 1981

[SEAL]

*Attest:*

RENE D. TEGTMEYER

*Attesting Officer*     *Acting Commissioner of Patents and Trademarks*